(12) United States Patent
Friberg

(10) Patent No.: US 8,192,203 B2
(45) Date of Patent: *Jun. 5, 2012

(54) DEVICE FOR CHECKING ANESTHESIA AND VENTILATION UNITS

(75) Inventor: Harri Friberg, Mauren (LI)

(73) Assignee: imtmedical ag, Buchs (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,679

(22) Filed: Mar. 22, 2011

(65) Prior Publication Data

US 2011/0167937 A1    Jul. 14, 2011

Related U.S. Application Data

(63) Continuation of application No. 11/719,498, filed as application No. PCT/IB2005/053834 on Nov. 21, 2005.

(30) Foreign Application Priority Data

Nov. 24, 2004    (CH) .................................... 1940/04

(51) Int. Cl.
G09B 23/28 (2006.01)
(52) U.S. Cl. .................. 434/262; 434/265; 434/272
(58) Field of Classification Search .................. 434/262, 434/265, 272; 128/200.24
See application file for complete search history.

(56) References Cited

U.S. PATENT DOCUMENTS

| | | | |
|---|---|---|---|
| 3,562,924 A | 2/1971 | Baerman et al. | |
| 3,808,706 A | 5/1974 | Mosley et al. | |
| 3,810,461 A | 5/1974 | McCormick | |
| RE29,317 E | 7/1977 | Mosley et al. | |
| 4,167,070 A | 9/1979 | Orden | |
| 4,430,893 A | 2/1984 | Barkalow | |
| 4,898,166 A | 2/1990 | Rose et al. | |
| 4,984,987 A | 1/1991 | Brault et al. | |
| 4,996,980 A | 3/1991 | Frankenberger et al. | |
| 5,286,206 A | 2/1994 | Epstein et al. | |
| 5,385,139 A | 1/1995 | Corn | |
| 5,403,192 A | 4/1995 | Kleinwaks et al. | |
| 5,580,255 A | 12/1996 | Flynn | |
| 5,719,916 A * | 2/1998 | Nelson et al. | 378/207 |
| 5,975,748 A | 11/1999 | East, IV et al. | |
| 6,283,120 B1 | 9/2001 | Kellon | |

(Continued)

FOREIGN PATENT DOCUMENTS

DE    2403616 A1    8/1974

(Continued)

OTHER PUBLICATIONS

International Search Report (ISR) dated Apr. 25, 2006 and Intn'l. Prelim. Report on Patentability dated May 30, 2007 from parent PCT application No. PCT/IB20051053834.

*Primary Examiner* — Kang Hu

(74) *Attorney, Agent, or Firm* — Matthew B. Dernier, Esq.; Gibson & Dernier LLP

(57) ABSTRACT

Apparatus for processes of checking anesthesia and ventilation devices, in the form of a test lung, comprising a lung sac (5), elastically deformable lobes (6, 7), an inlet nozzle (1) and adjustment means (8, 9, 10) for adjusting the simulation parameters. The test lung is in the form of a compact unit and permits the simulation of different lung types by adjustment of the lung parameters.

29 Claims, 2 Drawing Sheets

U.S. PATENT DOCUMENTS

| | | | |
|---|---|---|---|
| 6,874,501 B1 | 4/2005 | Estetter et al. | |
| 6,921,267 B2 * | 7/2005 | van Oostrom et al. | 434/272 |
| 7,100,618 B2 | 9/2006 | Dominguez | |
| D563,547 S | 3/2008 | Klien | |
| 7,959,443 B1 * | 6/2011 | Frembgen et al. | 434/265 |
| 2002/0023648 A1 | 2/2002 | Komesaroff | |
| 2004/0058305 A1 | 3/2004 | Lurie et al. | |
| 2009/0215017 A1 | 8/2009 | Friberg | |

FOREIGN PATENT DOCUMENTS

| | | |
|---|---|---|
| DE | 3427182 A1 | 1/1986 |
| DE | 19714684 A1 | 10/1998 |
| JP | S58-092365 A | 6/1983 |
| JP | H10-052496 A | 8/1996 |
| WO | 02/078768 A2 | 10/2002 |
| WO | 03/041778 A1 | 5/2003 |
| WO | 2006056927 A1 | 6/2006 |

* cited by examiner

DEVICE FOR CHECKING ANESTHESIA AND VENTILATION UNITS

This application claims benefit as a continuation of copending application Ser. No. 11/719,498 which is a 35 U.S.C. 371 national-phase entry of PCT International application no. PCT/IB2005/053834 filed on Nov. 21, 2005 and published as WO2006/056927A1 on Jun. 1, 2006, which in turn claims the benefit of priority of Swiss national application no. 01940/04 filed on Nov. 24, 2004; the entirety of parent U.S. application Ser. No. 11/719,498 and of PCT International application no. PCT/IB2005/053834 are both expressly incorporated herein by reference, each in their entirety, for all intents and purposes, as if identically set forth herein.

BACKGROUND

The invention relates to an apparatus for processes of checking anesthesia and ventilation devices, comprising a lung sac arranged between two lobes movable relative to one another, a lung inlet and adjustment means for adjusting the simulation parameters.

Such devices or apparatuses also referred to as "lung simulators" or as "test lung" are used for checking ventilation devices of all kinds and also anesthesia devices for satisfactory operation before use on humans. The test lungs should if possible be capable of simulating different lung types. The properties of a lung are determined by the parameters resistance (respiratory tract resistance), compliance (hardness of the lungs) and leakage.

In the case of the test lungs used to date, a distinction should be made between two types differing substantially from one another:

Economical conventional test lungs are generally formed by a simple rubber sac (or balloon) which has exactly one resistance (respiratory tract resistance), one compliance (hardness of the lungs) and no leakage. Thus, checking of a ventilation device or anesthesia device with such test lungs is possible only to an insufficient extent since it is not possible to simulate different lung types therewith. This frequently leads to alleged malfunctions of the device to be tested (e.g. so-called autotriggering), although the lung device to be tested is completely in order.

On the other hand, very complicated and expensive test lungs which operate, for example, by means of a bellows or a cylinder/piston system are disclosed, for example, in DE-A 2 403 616 or DE-A 3 427 182. In the case of such test lungs, the setting of the resistance (i.e. of the respiratory tract resistance) by means of various adapters and the setting of the compliance (i.e. hardness of the lungs) by means of springs or by means of a cylinder/piston system is achieved in fine gradation. Owing to the substantial mechanical design, such test lungs are very heavy, complicated to operate, expensive and generally operable only by means of external energy.

SUMMARY

It is therefore the object of the invention to provide a simple test lung which can be economically produced and avoids said disadvantages.

According to the invention, this is achieved if at least one of the two lobes is in the form of an elastically deformable lobe. A compact design and a low weight of the lung simulator are achieved thereby, and use without additional aids directly on the ventilation tube system is permitted.

In an expedient embodiment, both lobes are in the form of elastically deformable lobes. The lung sac is therefore arranged symmetrically between the two deformable lobes. This permits uniform expansion and contraction of the lung sac.

The lobes are advantageously firmly clamped at one end and elastically deformable. The lobes thus act in the manner of leaf springs. The spring properties can be influenced by the choice of the width and material thickness.

For handling the lung simulator, it is expedient if at least one of the lobes consists of plastic. Plastic lobes are chemically very resistant, kind to the body and durable.

In order that the spring properties of the lobes remain constant in the course of operation over the entire life, the lobe or lobes advantageously comprise reinforced fibre composite. Depending on requirements, reinforcement may consist, for example, of glass fibres or polycarbonates.

In a further expedient embodiment, at least one of the lobes consists of spring steel. Spring steel permits a small wall thickness of the lobes and thus a very compact design.

For simple production and assembly of the lung simulator, it is advantageous if the two lobes are integrally connected to one another. The two lobes can preferably be connected to one another in a U-shape.

The springy length of the lobes is expediently adjustable by means of aids. This makes it possible firstly to change the spring temper of the lobes and secondly also the usable volume of the lung sac. The greater the springy length of the lobes, the softer are their spring properties. By shortening the springy length, the lobes become harder. This makes it possible to check different requirements using the same test lung.

The aids are advantageously in the form of slides connecting the free ends of the lobes to one another and displaceable and fixable in the longitudinal direction of the lobes. The slide can grip around the lobes from the outside or pass through them. The slide can be fixed, for example, by means of a clamping screw which can be loosened.

The slide is expediently lockable stepwise. This makes it possible to obtain unambiguously defined and repeatable test parameters. Moreover, this also prevents the parameters from becoming accidentally misadjusted in the course of the check.

The lung sac is advantageously flat and interchangeable. Owing to the flat design, the lung sac fits ideally in the space between the two lobes. The flat shape also permits a relatively large reservoir volume. Owing to the interchangeability of the lung sac, it is possible to check requirements with different lung volumes using the same test lung.

Expediently, the lung parameters "resistance" (respiratory tract resistance) and/or "compliance" (hardness of the lungs) and/or "leakage" (leakage losses) can be adjusted independently of one another in different steps. Owing to the very simple adjustability of the respiratory tract resistance, adjustable hardness of the lungs and adjustable leakage losses in different steps, virtually all lung types from babies to adults can be simulated without the use of additional adapters.

Continuous leakage simulation is advantageously provided. This makes it possible to check the function of patient flow triggering, which is very sensitive in practice, and respiration with leakage in a simple manner by changing the leakage simulation.

For monitoring the behavior of the test lung, it is expedient if flow, pressure and/or volume measurements are integrated in the apparatus and the values can be displayed by means of a display unit on the test lung.

BRIEF DESCRIPTION OF THE DRAWINGS

The invention is explained in more detail below with reference to the drawings illustrated by way of example.

DETAILED DESCRIPTION

Figures 1, 2:
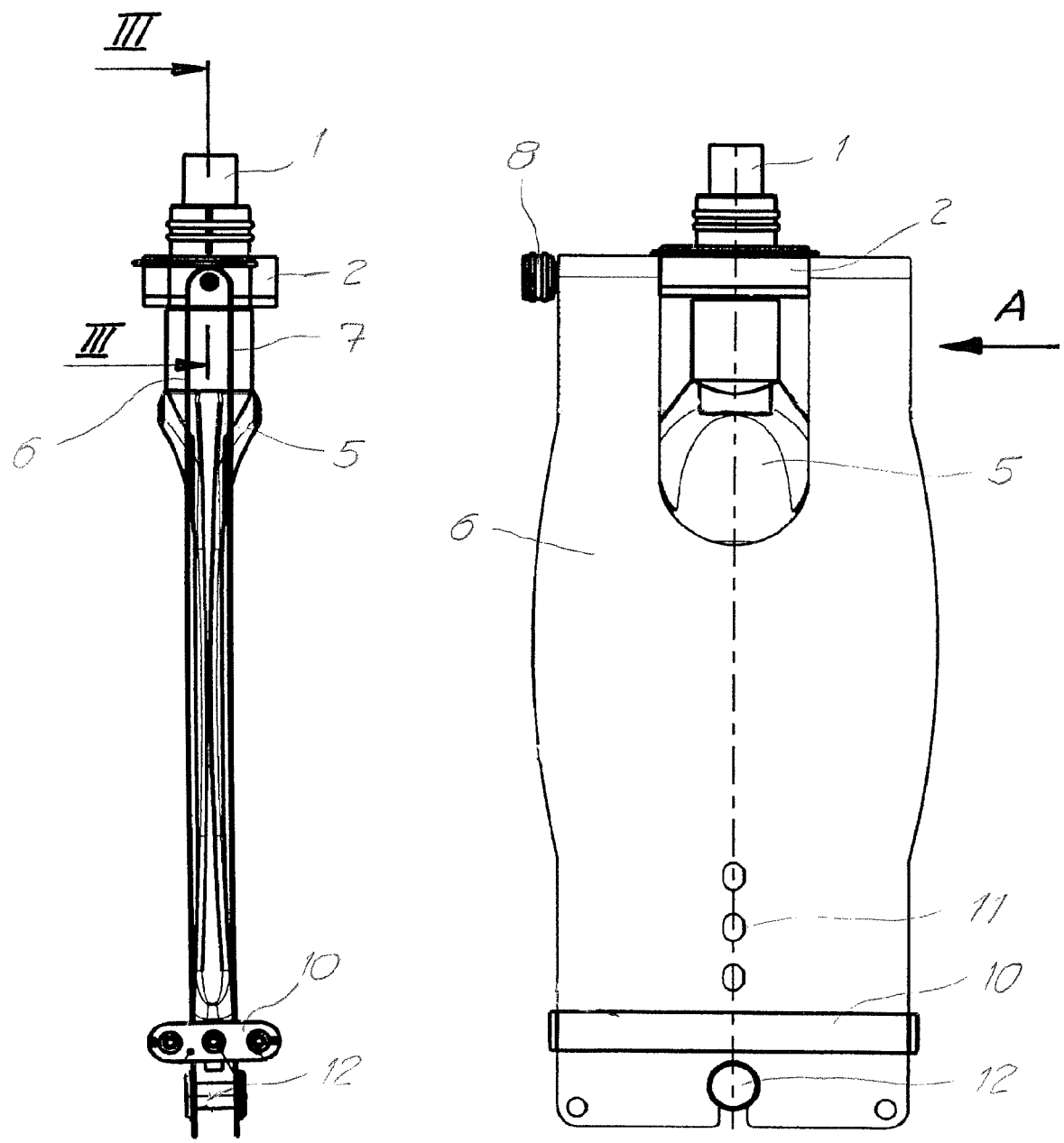
FIG. 1 shows a plan view of a test lung.
FIG. 2 shows a view of the test lung shown in FIG. 1, in the direction of the arrow A.
Figure 3:
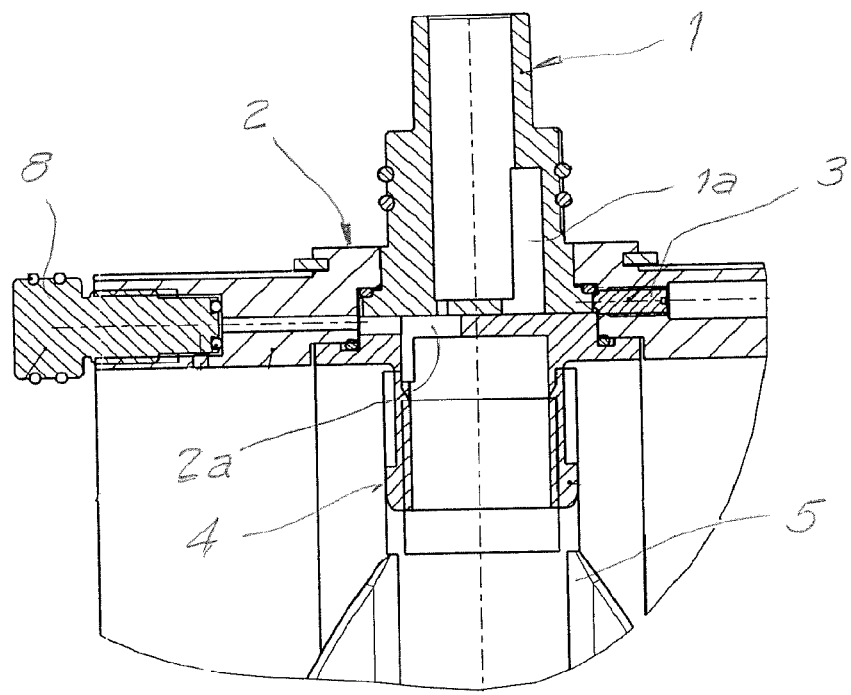
FIG. 3 shows a cross-section through the test lung shown in FIG. 2, along the line III-III.
Figure 4:
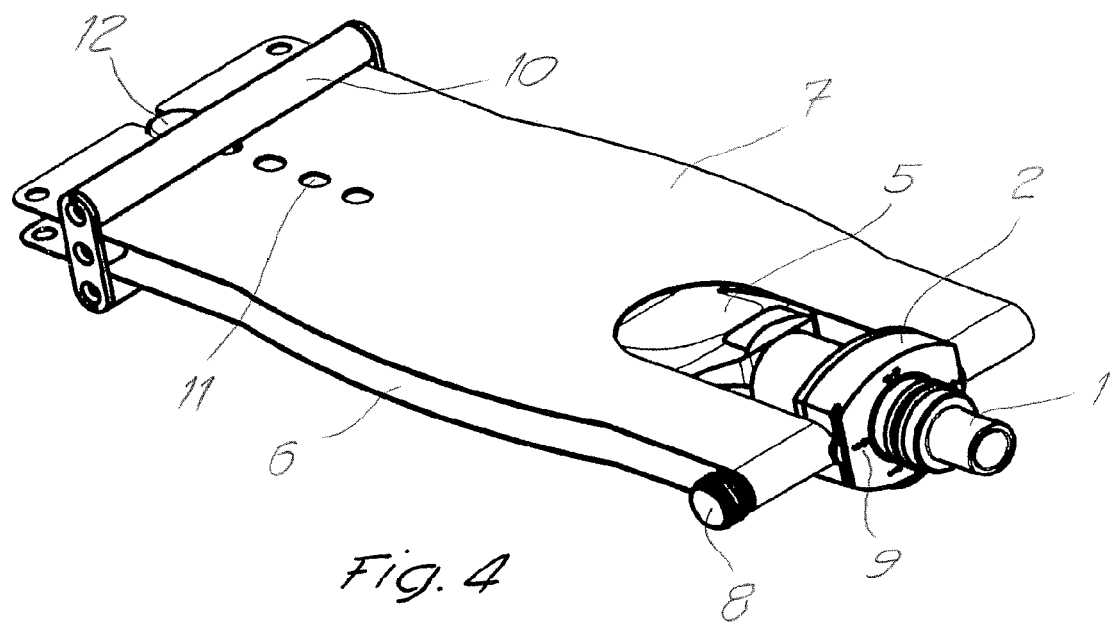
FIG. 4 shows a perspective view of the test lung shown in FIGS. 1 and 2.

The test lung shown in FIGS. 1 to 4 comprises an inlet nozzle 1 which is connected to a housing 2 so as to be rotatable about its longitudinal axis. The inlet nozzle is provided with at least one channel 1*a* which can be brought into coincidence with passages 2*a* in the housing 2. The inlet nozzle 1 can be fixed in a desired rotational position by means of a lock 3—for example in the form of a ball catch or in the form of a clamping screw. This makes it possible to set a desired passage cross-section. On the opposite side of the inlet nozzle 1 is a connector 4. A balloon-like interchangeable lung sac 5 can be connected to the connector. The lung sac 5 is arranged between two elastically formed lobes 6, 7. The two lobes 6, 7 are preferably connected to one another in an integral and U-shaped manner around the housing 2. For inflating the lung sac 5, the lobes 6, 7 must be spread apart. Owing to their spring properties, the lobes 6, 7 offer a certain defined resistance to the spreading apart.

A control valve 8 is arranged on the side of the housing 2. The control valve 8 serves for setting a simulated leakage loss. In the position shown in FIG. 3, the control valve 8 is completely closed and the leakage loss is therefore zero. By unscrewing the control valve 8, the leakage loss can be continuously adjusted.

A scale 9 is mounted on the end face of the housing 2. With the aid of the scale 9, it is possible to determine the current rotational position of the inlet nozzle. On the basis of this scale, the simulation parameters can be changed stepwise or continuously. The set values are reproducible at any time.

The free ends of the lobes 6, 7 are connected to one another via an adjustable slide 10. By moving the slide 10, the spring properties of the lobes 6, 7 and hence the so-called compliance, i.e. the hardness of the test lung, can be adjusted. The slide 10 can be fixed stepwise by means of projections or cams engaging catch openings 11 in the lobes 6, 7. By shortening the free length of the lobes 6, 7, the spring stiffness thereof is increased. At the same time the usable volume of the lung sac 5 is also reduced. In addition, a fixing screw 12 which serves for fixing that end of the lung sac 5 which is opposite the connector 4 to the lobes 6, 7 is arranged at the free end of the lobes 6, 7.

LIST OF REFERENCE NUMERALS

1 Inlet nozzle
1*a* Channel
2 Housing
2*a* Passage
3 Lock
4 Connector
5 Lung sac
6 Lobe
7 Lobe
8 Control valve
9 Scale
10 Slide
11 Catch opening
12 Fixing screw

What is claimed is:

1. A lung simulator comprising:
   a first lobe panel, said first lobe panel being elastically deformable, said first lobe panel having a fixed first longitudinal end;
   a sac disposed under said first lobe panel, said sac having a volume;
   an inlet nozzle adapted for connection with a ventilation unit, said nozzle in fluid communication with said sac;
   said first lobe panel having a second longitudinal end opposite to said first longitudinal end;
   a second longitudinal end region of said first lobe panel proximate to said second longitudinal end; and,
   an adjustable slide configured to stepwise lockably establish defined test parameters for lung compliance, said slide being disposed at said second longitudinal end region of said first lobe panel to stepwise lockably adjust deformable springy length of said first lobe panel independently of said sac's volume.

2. A lung simulator as claimed in claim 1, further comprising:
   a housing supporting said inlet nozzle; and,
   an adjustable control valve threaded into a bore in said housing, said adjustable control valve selectively controlling gas leakage from said inlet nozzle.

3. A lung simulator as claimed in claim 1, further comprising:
   a housing configured to rotatably support said inlet nozzle;
   a lock configured to fix said inlet nozzle at one of plural selectable rotational locations relative to said housing; and,
   a variable inlet passage for nozzle flow, said variable inlet passage having flow cross-sectional area determined by a selected rotational location of said inlet nozzle relative to said housing.

4. The lung simulator as claimed in claim 1, wherein:
   said first lobe panel is made of plastic.

5. The lung simulator as claimed in claim 4, wherein:
   said first lobe panel includes reinforced fiber composite.

6. The lung simulator as claimed in claim 1, wherein:
   said first lobe panel is made of spring steel.

7. A lung simulator as claimed in claim 1, further comprising:
   a second lobe panel, said second lobe panel having a respective fixed first longitudinal end, said second lobe panel having a respective second longitudinal end opposite to said first longitudinal end of said second panel.

8. The lung simulator as claimed in claim 7, wherein:
   said respective first longitudinal end of said first lobe panel is integrally connected to said second lobe panel's respective first longitudinal end.

9. A lung simulator as claimed in claim 7, further comprising:
   said second lobe panel having a respective second longitudinal end region proximate to its respective second longitudinal end, and said adjustable slide being disposed at said second longitudinal end region of said second lobe panel to stepwise lockably adjust deformable springy length of said second lobe panel independently of said sac's volume.

10. A lung simulator comprising:
    a first lobe panel, said first lobe panel being elastically deformable, said first lobe panel having a fixed first longitudinal end;
    a sac disposed under said first lobe panel, said sac having a volume;

an inlet nozzle adapted for connection with a ventilation unit, said nozzle in fluid communication with said sac;

said first lobe panel having a second longitudinal end opposite to said first longitudinal end;

a second longitudinal end region of said first lobe panel proximate to said second longitudinal end;

an adjustable slide configured to stepwise lockably establish defined test parameters for lung compliance, said slide being disposed at said second longitudinal end region of said first lobe panel to stepwise lockably adjust deformable springy length of said first lobe panel independently of said sac's volume;

a housing configured to rotatably support said inlet nozzle;

a lock configured to fix said inlet nozzle at one of plural selectable rotational locations relative to said housing;

a variable inlet passage for nozzle flow, said variable inlet passage having flow cross-sectional area determined by a selected rotational location of said inlet nozzle relative to said housing; and, an adjustable control valve threaded into a bore in said housing, said adjustable control valve selectively controlling gas leakage from said inlet nozzle.

11. A lung simulator as claimed in claim 10, further comprising:

a second lobe panel, said second lobe panel having a respective fixed first longitudinal end, said second lobe panel having a respective second longitudinal end opposite to said first longitudinal end of said second panel.

12. The lung simulator as claimed in claim 11, wherein:

said respective first longitudinal end of said first lobe panel is integrally connected to said second lobe panel's respective first longitudinal end.

13. A lung simulator as claimed in claim 11, further comprising:

said second lobe panel having a respective second longitudinal end region proximate to its respective second longitudinal end, and said adjustable slide being disposed at said second longitudinal end region of said second lobe panel to stepwise lockably adjust deformable springy length of said second lobe panel independently of said sac's volume.

14. A lung simulator as claimed in claim 10, further comprising:

a rotary hand knob configured for manual rotation of said adjustable control valve.

15. A lung simulator as claimed in claim 10, further comprising:

a scale configured to indicate the rotational position of said inlet nozzle, said scale mounted on an end face of said housing.

16. A method for testing respiratory devices comprising steps of:

connecting a test lung having a first elastically deformable lobe panel that restrains expansion of a sac;

selectively adjusting a control valve to control gas leakage from an inlet of said sac to simulate a selected leakage parameter;

selecting a sac sized at a selected volume to simulate a selected lung volume;

selectively adjusting a variable inlet passage cross-sectional area in the inlet to said sac to simulate a selected respiratory flow resistance parameter; and, selectively adjusting deformable springy length of the first elastically deformable lobe panel independently of the sac's volume by an adjustable slide to simulate a selected lung compliance at the lung volume simulated by the selected sac.

17. A method for testing respiratory devices as claimed in claim 16, further comprising the step of:

providing the test lung with a second elastically deformable lobe panel that restrains expansion of the sac.

18. A method for testing respiratory devices as claimed in claim 17, further comprising the step of:

selectively adjusting deformable springy length of the second elastically deformable lobe panel independently of the sac's volume by the adjustable slide to simulate a selected lung compliance at the lung volume simulated by the selected sac.

19. A method for testing respiratory devices as claimed in claim 16, further comprising the step of:

providing a stepwise-lockable slide as the adjustable slide.

20. A method for testing respiratory devices as claimed in claim 16, further comprising the steps of:

unambiguously defining in a repeatable manner the parameters of leakage, respiratory flow resistance, and lung compliance during use of the test lung; and, adjusting respiratory flow resistance, lung compliance, and leakage parameters independently of one another.

21. A lung simulator comprising:

a first lobe panel, said first lobe panel being elastically deformable, said first lobe panel having a fixed first-panel first longitudinal end;

a second lobe panel, said second lobe panel being elastically deformable, said second lobe panel having a fixed second-panel first longitudinal end;

said first-panel first longitudinal end being fixed in common integration with said second-panel first longitudinal end;

a sac disposed between said first and second lobe panels, said sac having a volume;

a lung inlet adapted for fluid communication with a ventilation unit, said lung inlet being in fluid communication with said sac;

said first lobe panel having a first-panel second longitudinal end opposite to said first-panel first longitudinal end;

a first-panel second longitudinal end region of said first lobe panel proximate to said second longitudinal end;

said second lobe panel having a second-panel second longitudinal end opposite to said second-panel first longitudinal end;

a second-panel second longitudinal end region of said second lobe panel proximate to said second-panel second longitudinal end; and, an adjustable slide arrangement disposed over said first-panel second longitudinal end region and said second-panel second longitudinal end region, said slide arrangement configured to clamp said first and second lobes to establish test parameters for lung compliance, said slide arrangement lockably adjusting deformable springy length of said first and second lobe panels independently of said sac's volume.

22. The lung simulator as claimed in claim 21, wherein:

said lobe panels are made of plastic.

23. A lung simulator comprising:

a first lobe panel, said first lobe panel being elastically deformable, said first lobe panel having a fixed first-panel first longitudinal end;

a second lobe panel, said second lobe panel being elastically deformable, said second lobe panel having a fixed second-panel first longitudinal end;

said first-panel first longitudinal end being connected in common integration with said second-panel first longitudinal end;

a sac disposed between said first and second lobe panels;

a lung inlet adapted for fluid communication with a ventilation unit, said lung inlet being in fluid communication with said sac;

said first lobe panel having a first-panel second longitudinal end opposite to said first-panel first longitudinal end;

a first-panel second longitudinal end region of said first lobe panel proximate to said second longitudinal end;

said second lobe panel having a second-panel second longitudinal end opposite to said second-panel first longitudinal end;

a second-panel second longitudinal end region of said second lobe panel proximate to said second-panel second longitudinal end; and, an adjustable slide arrangement configured to clamp said first and second lobes to establish test parameters for lung compliance, said slide arrangement disposed over said first-panel second longitudinal end region and said second-panel second longitudinal end region to lockably adjust deformable springy length of said first and second lobe panels independently of a surface of said sac.

24. The lung simulator as claimed in claim 23, wherein:
said lobe panels are made of plastic.

25. A lung simulator comprising:
a first lobe panel, said first lobe panel being elastically deformable, said first lobe panel having a fixed first-panel first longitudinal end;
a second lobe panel, said second lobe panel being elastically deformable, said second lobe panel having a fixed second-panel first longitudinal end;
said first-panel first longitudinal end being connected with said second-panel first longitudinal end;
a sac disposed between said first and second lobe panels;
a lung inlet adapted for fluid communication with a ventilation unit, said lung inlet being in fluid communication with said sac;
said first lobe panel having a first-panel second longitudinal end opposite to said first-panel first longitudinal end;
said second lobe panel having a second-panel second longitudinal end opposite to said second-panel first longitudinal end; and,
an adjustable slide arrangement configured to clamp said first and second lobes to establish test parameters for lung compliance, said slide arrangement disposed over said first lobe panel and said second lobe panel to lockably adjust deformable springy length of said first and second lobe panels independently of a surface of said sac.

26. The lung simulator as claimed in claim 25, wherein:
said lobe panels are made of plastic.

27. A lung simulator comprising:
a first lobe panel, said first lobe panel being elastically deformable, said first lobe panel having a fixed first-panel first longitudinal end;
a second lobe panel, said second lobe panel being elastically deformable, said second lobe panel having a fixed second-panel first longitudinal end;
said first-panel first longitudinal end being connected with said second-panel first longitudinal end;
a sac disposed between said first and second lobe panels, said sac having a volume;
a lung inlet adapted for fluid communication with a ventilation unit, said lung inlet being in fluid communication with said sac;
said first lobe panel having a first-panel second longitudinal end opposite to said first-panel first longitudinal end;
said second lobe panel having a second-panel second longitudinal end opposite to said second-panel first longitudinal end; and,
an adjustable slide arrangement configured to clamp said first and second lobes to establish test parameters for lung compliance, said slide arrangement disposed over said first lobe panel and said second lobe panel to lockably adjust deformable springy length of said first and second lobe panels independently of said sac's volume.

28. The lung simulator as claimed in claim 27, wherein:
said lobe panels are made of plastic.

29. A method for testing respiratory devices comprising steps of:
connecting a test lung having first and second elastically deformable lobe panels that restrain expansion of a sac;
selecting a sac sized at a selected volume to simulate a selected lung volume;
selecting a lung inlet passage cross-sectional area at an inlet to said sac to simulate a selected respiratory flow resistance parameter; and,
selectively adjusting deformable springy length of the first and second elastically deformable lobe panels independently of the sac's volume by an adjustable slide arrangement to simulate a selected lung compliance at the lung volume simulated by the selected sac.

* * * * *